US006530466B2

(12) United States Patent
Murata et al.

(10) Patent No.: US 6,530,466 B2
(45) Date of Patent: Mar. 11, 2003

(54) OVERHEAD CONVEYANCE DEVICE AND OVERHEAD CONVEYANCE VEHICLE

(75) Inventors: Masanao Murata, Ise (JP); Teruya Morita, Ise (JP); Hitoshi Kawano, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 0 days.

(21) Appl. No.: 10/193,214

(22) Filed: Jul. 12, 2002

(65) Prior Publication Data

US 2002/0179409 A1 Dec. 5, 2002

Related U.S. Application Data

(62) Division of application No. 09/446,194, filed as application No. PCT/JP98/02608 on Jun. 12, 1998, now Pat. No. 6,427, 824.

(30) Foreign Application Priority Data

Jun. 17, 1997 (JP) ............................................ 9-160189

(51) Int. Cl.[7] ................................................ B65G 29/00

(52) U.S. Cl. ................................ 198/465.4; 198/678.1; 198/680; 198/687

(58) Field of Search ........................... 198/465.4, 678.1, 198/680, 682, 687

(56) References Cited

U.S. PATENT DOCUMENTS 3,001,634 A * 9/1961 Bauder ....................... 198/682
3,495,720 A * 2/1970 Mann, Jr. et al. ............. 104/89
3,777,875 A * 12/1973 Sobran ....................... 198/680
3,863,753 A * 2/1975 Shank, Jr. .................... 198/680
3,894,630 A * 7/1975 Shank, Jr. ................ 198/470.1
4,180,152 A * 12/1979 Sefcik ................... 198/377.06
4,513,682 A * 4/1985 Otocki ........................ 118/322
5,346,054 A * 9/1994 Kawasaka ................ 198/465.4
5,570,990 A 11/1996 Bonora et al.
5,628,604 A 5/1997 Murata et al.
5,664,927 A 9/1997 Takeuchi
5,668,452 A 9/1997 Villarreal et al.
5,893,795 A 4/1999 Perlove et al.
5,904,478 A 5/1999 Weaver et al.
6,247,597 B1 6/2001 Sato

* cited by examiner

*Primary Examiner*—Christopher P. Ellis
*Assistant Examiner*—Richard Ridley
(74) *Attorney, Agent, or Firm*—Oblon, Spivak, McClelland, Maier & Neustadt, P.C.

(57) ABSTRACT

An overhead conveyance device and an overhead conveyance vehicle that can convey a conveying object, while keeping it at a minimum distance from surrounding equipment when the overhead conveying vehicle turns around during conveyance of the conveying object. The overhead conveyance device (1) is so structured that even when a carriage part (6) of the overhead conveyance vehicle (5) enters a branching part (3) for allowing the carriage part to change in traveling direction and turns around, the conveying object (25) grasped by a hand (9) can be kept unchanged in direction.

1 Claim, 8 Drawing Sheets

OVERHEAD CONVEYANCE DEVICE AND OVERHEAD CONVEYANCE VEHICLE

TECHNICAL FIELD

This invention relates to an overhead conveyance device and an overhead conveyance vehicle that travels along an overhead track to convey a conveying object (a carrier) between processing units disposed in a cleanroom and the like, after putting the carrier in its suspended state.

BACKGROUND ART

For example, a conveyance system configured in a cleanroom for wafers used for manufacturing semiconductor devices uses an overhead conveyance vehicle that travels along an overhead track to convey a wafer-containing carrier between semiconductor processing units or between a semiconductor processing unit and a stocker and handler. The overhead conveyance vehicle comprises a carriage part that travels along a track, a hand suspending part provided in the carriage part, and a hand suspended from the hand suspending part in such a manner as to freely move up and down. The overhead conveyance vehicle is so structured that the hand grasps a carrier put on a load port of the processing unit; the hand suspending part raises the hand; and the carriage part travels along the track.

In this conveyance system, a rotary branching part (turning table type) is located in the track at a proper place thereof, in order to increase a conveyance rate per unit of time or shorten the conveyance time. In the branching part, the conveyance vehicle grasping the carrier is made to turn around 90 degrees.

Incidentally, many wafer containing carriers have a configuration in which protrusion of the carrier from the center varies as the carrier turns around. These types of carriers have a configuration of an oval cut in half, not a circular configuration, when viewed from the top. Due to this, when the rotary branching part is located over the processing unit, the turntable carrier must be kept at a sufficient distance from the processing unit, in order to prevent interference with the processing unit.

In the conveyance system above, the tracks for conveying the carrier between these units are placed, after a plurality of processing units are located in the cleanroom. If the tracks are placed with reference to the maximum protrusion of the carrier, that would limit the placing of the tracks, complicate the conveyance route and require an increased size of the entire building. Also, that could exert an influence upon the number and relative relationships of opposite processing units arranged in parallel, depending on the placing of the tracks.

SUMMARY OF THE INVENTION

It is an object of the invention to provide an overhead conveyance device and an overhead conveyance vehicle that can convey a conveying object, while keeping it at a minimum distance from a processing unit when the overhead conveyance vehicle conveying the conveying object changes direction.

According to the first invention, a rotary branching part to allow an overhead conveyance vehicle to change direction is located in an overhead track. The overhead conveyance vehicle has a hand suspending part rotatable relative to the carriage part, which travels along the track, a hand part suspended from the hand suspending part in such a manner as to be movable up and down, and driving means for rotating the hand suspending part relative to the carriage part in the opposite direction when the carriage part travels into the branching part and turns.

According to the second invention, there are provided control units for recognizing an extent of rotation of the branching part and driving the driving means, in addition to the features of the first invention. The extent of rotation of the branching part includes the one using optical communications to receive an rotation angle of the branching part, the one using an angle detecting device, such as a gyro, built in the hand suspending part, and a distance sensor for detecting a distance between the hand suspending part and the processing unit.

According to the third invention, a rotary branching part to allow the carriage part to change direction is located in the overhead track. Further, there are provided a first fixing means that permits the carriage part to turn relative to the hand suspending part but prevents the hand suspending part from turning when the carriage part is turned by the branching part; and a second fixing means that prevents the hand suspending part from turning relative to the carriage part during the usual traveling of the carriage part.

According to the fourth invention, in addition to the features of the third invention, there are provided the first fixing means located on the track side and a stopper located in such a manner as to be movable back and forth with respect to the hand suspending part. A linear actuator located in a support of the branching part in such a relation as to be movable back and forth with respect to a corner or a projection of the hand suspending part is cited as an example of the stopper.

According to the fifth invention, there are provided a carriage part that travels along an overhead track, a hand suspending part mounted on the carriage part in rotatable relation relative thereto, a hand part suspended from the hand suspending part in such a manner as to be movable up and down, and rotation control means for controlling turning of the hand suspending part relative to the carriage part.

According to the first and second invention, when the carriage part of the overhead conveyance vehicle travels into the rotary branching part and starts to turn, the extent of the turning is recognized and the hand suspending part can be turned relative to the carriage part in the opposite direction to the extent corresponding to the extent of the turning. This can permit only the carriage part to change in direction, without changing the direction of the conveying object grasped by the hand part. This enables the overhead conveyance vehicle to branch off, keeping the conveying object at a minimum distance from the processing unit. The processing units are not subject to the constraints resulting from the turning of the conveying object, such as reduction of their heights or widening of an interval between adjoining processing units arranged in parallel. As the processing units are commonly crowded into a limited place in a cleanroom, liberalization from those constraints can produce the advantageous effects that the number of processing units to be located can be increased and that the conveyance route is not required to be complicated. Also, since the overhead conveyance vehicle controls the turning of the hand suspending part, the branching part is not required to be complicated in structure.

According to the third and fourth invention, when the carriage part travels into the rotary branching part and starts to turn, the second fixing means is switched to OFF and the first fixing means is switched to ON to keep the hand suspending part unchanged in direction. This can permit only the carriage part to change in direction, without changing the direction of the conveying object grasped by the hand part. This enables the overhead conveyance vehicle to branch off, keeping minimal the distance between the conveying object and the processing unit. Also, the processing units are not subject to the constraints resulting from the turning of the conveying object, such as reduction of their heights or widening of an interval between adjoining processing units arranged in parallel. As the processing units are commonly crowded into a limited place in a cleanroom, liberalization from those constraints can produce the advantageous effects that the number of processing units to be located can be increased and that the conveyance route is not required to be complicated. Also, although the branching part is required to have the first fixing means, since the overhead conveyance vehicle is simply required to have the second fixing means, the overhead conveyance vehicle is not required to be complicated in structure.

According to the fifth invention, since the hand suspending part is turned under control of the rotation controlling means, the conveying object grasped by the hand part can be freely changed in direction on the conveyance way. The conveying object can be prevented from interfering with the processing unit in the conveyance by changing the direction of the conveying object.

BEST MODE FOR CARRYING OUT THE INVENTION

The present invention will be described in further detail with reference to the accompanying drawings.

Figure 5:
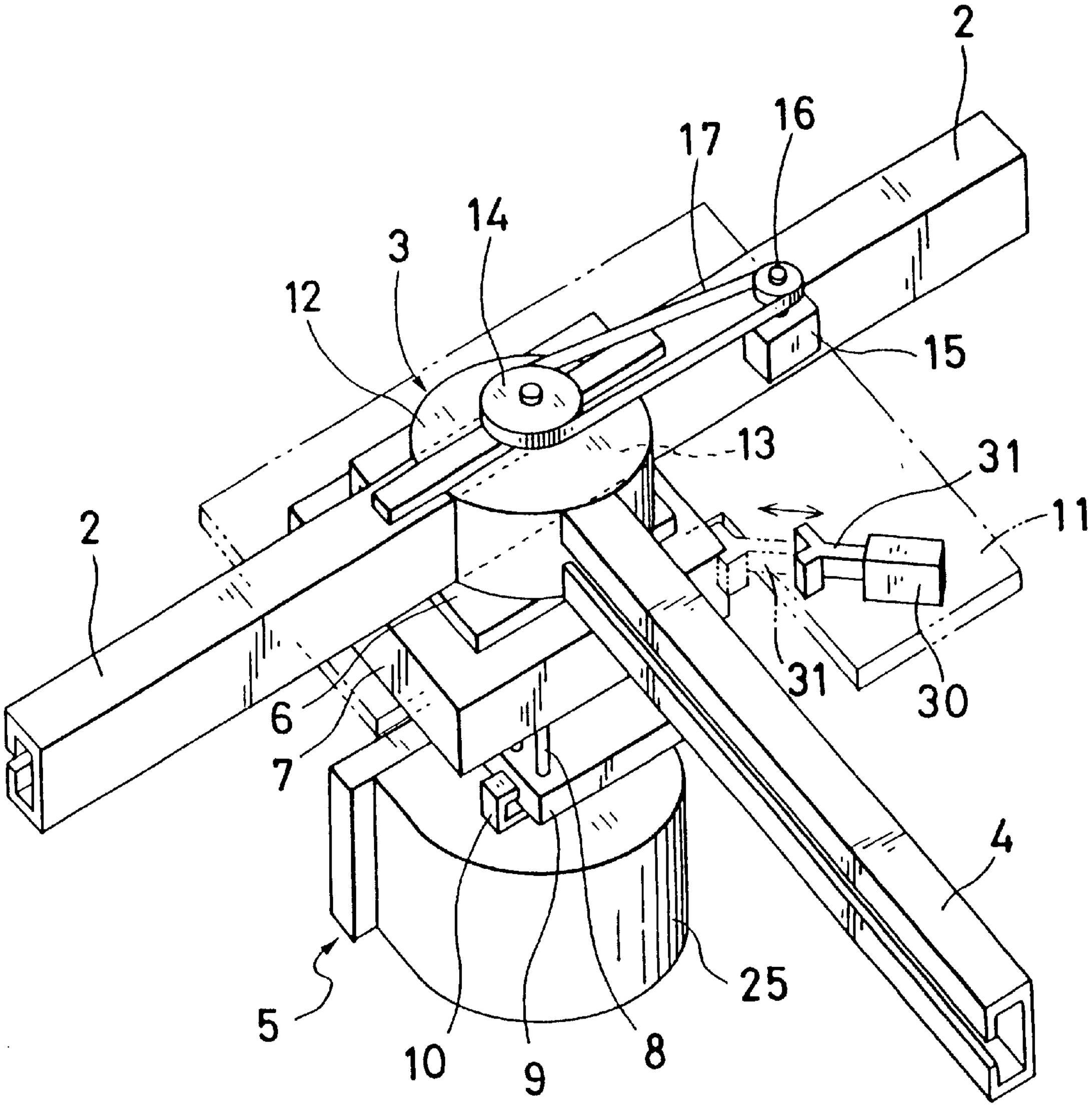
FIG. 5 is a perspective view of another overhead conveyance device of the invention.
Figure 6:
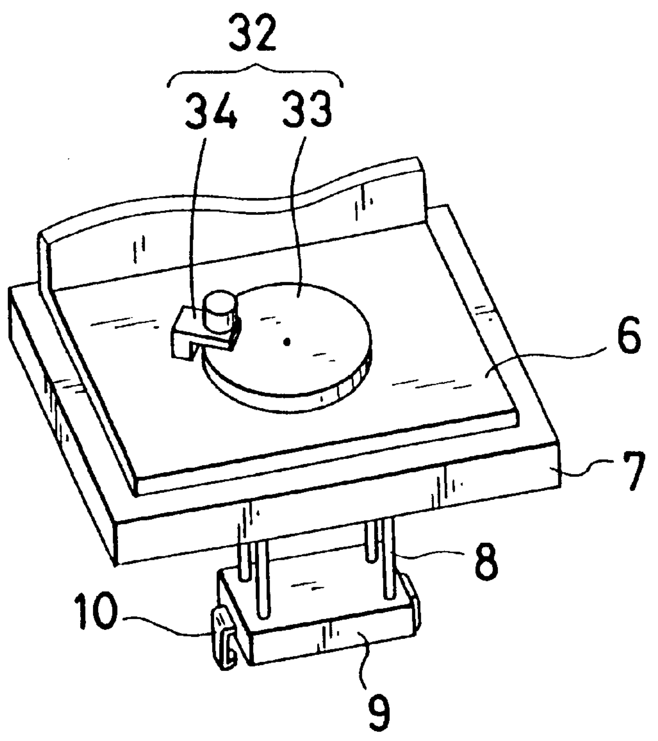
FIG. 6 is a diagram showing a fixing means for the hand suspending part to the carriage part.
Figure 7:
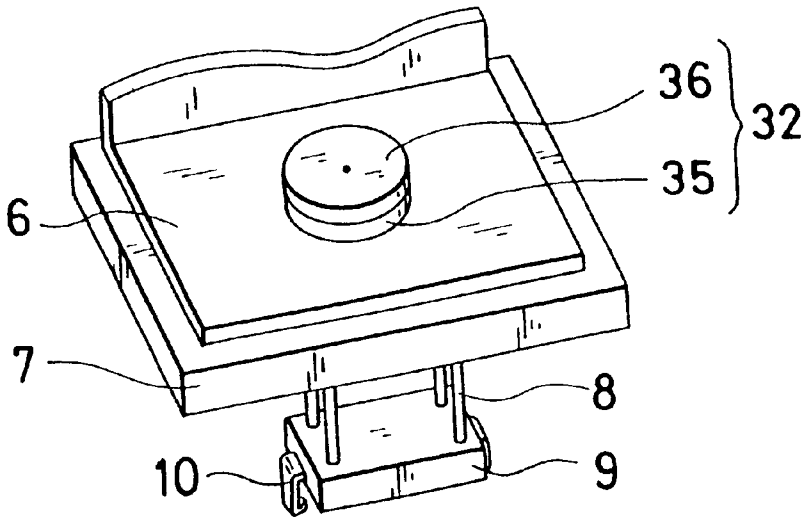
FIG. 7 is a diagram showing another fixing means of the hand suspending part to the carriage part.

FIGS. 1–4 are views showing the first embodiment, and FIGS. 5–7 are views showing the second embodiment.

Figure 1:
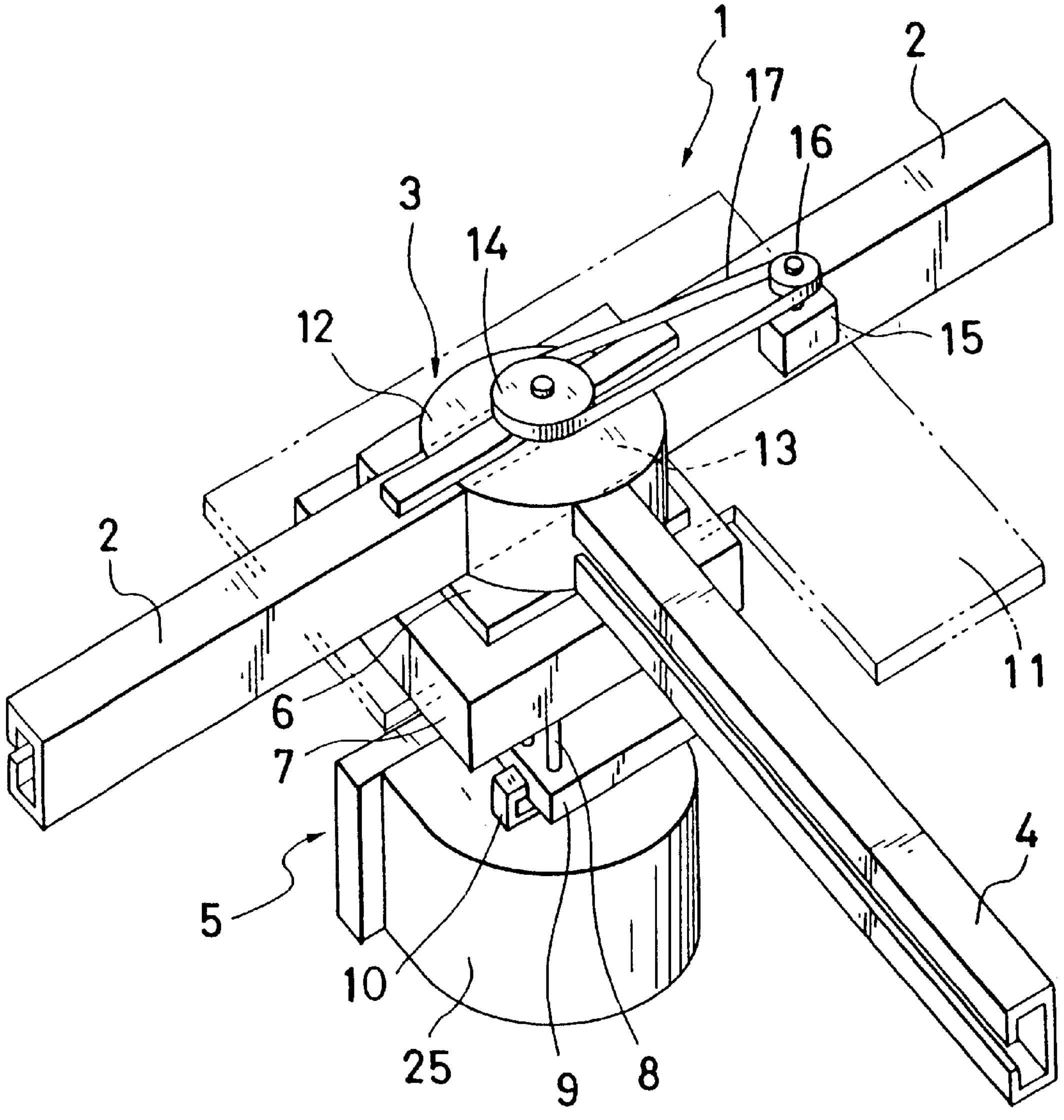
FIG. 1 is a perspective view of an overhead conveyance device of the invention.

First, description on the overhead conveyance device of the first embodiment will be given with reference to FIGS. 1–4. In FIG. 1, an overhead conveyance device 1 of the invention is composed of a track 2 provided at the ceiling side of a building and the like, a rotary branching part 3 (hereinafter it is called the branching part 3) located in the track 2, a by-pass track 4 branched off of the track 2 by the branching part 3, and an overhead conveyance vehicle 5 that travels along each of the tracks 2, 4. The overhead conveyance vehicle 5 has a carriage part 6 that travels along each of the tracks 2, 4, a hand suspending part 7 mounted on the carriage part 6 in a rotatable manner, and a hand 9 (hand part) suspended from the hand suspending part 7 in such a manner as to be movable up and down through a sling member 8 (of strip-form) to be taken up by the hand suspending part 7. The overhead conveyance vehicle 5 grasps a conveying object 25 with open-close pawls 10 provided at the hand 9.

The rotary branching part 3 is provided with a turning table 12. The turning table 12 is journaled at a support 11 fixed to a ceiling of the building.

The turning table 12 has a table track 13 that is connected between the tracks 2, 2 and is connectable to the by-pass track 4. A pulley 14 is fixed to an end of a shaft projecting from the turning table 12, and the turning table 12 is connected to a table-use motor 15 via the pulley 14 and others. The table-use motor 15 is mounted on the support 11 and has a pulley 16 at an end of a drive shaft. The table-use motor 15 is connected to the turning table 12 via a timing belt 17 extending between a pulley 16 and a pulley 14. Thus, the turning table 12 can bring the table track 13 into the connection to the by-pass track 4 from the connection between the tracks 2, 2, and vice versa, by the drive of the table-use motor 15. In other words, the turning table 12 is turned with a turning angle of 90 degrees by the table-use motor 15.

Figure 2:
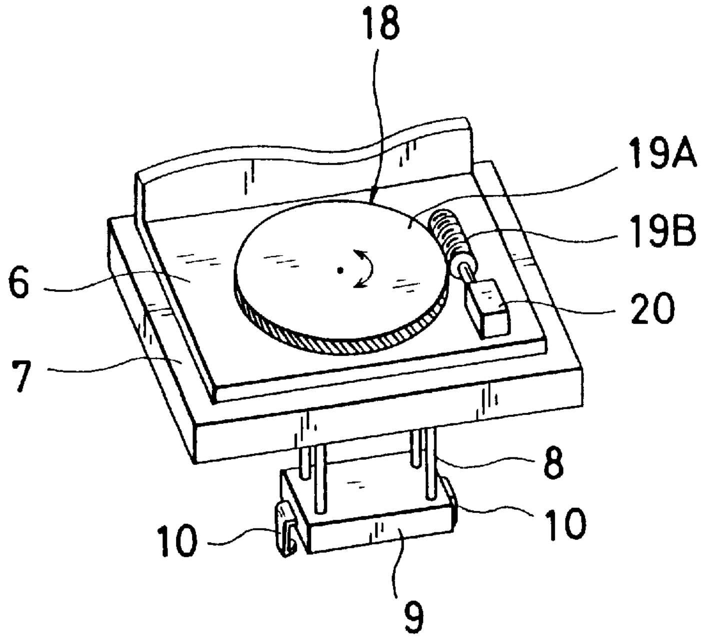
FIG. 2 is a diagram showing rotation drive means of a hand suspending part with respect to a carriage part.

A driving means 18 is provided in the interior of the carriage part 6, as shown in FIG. 2. The driving means 18 is for rotating the hand suspending part 7 (hand 9) relative to the carriage part 6. The driving means 18 is composed of a pair of worm gears 19A, 19B and a hand-use motor 20 for rotating one worm gear 19B, as shown in FIG. 2. The worm gear 19A is fixed to an end of a shaft projecting from the hand suspending part 7 into the carriage part 6 and the worm gear 19B is placed in engagement with it. Thus, the hand suspending part 7 is turned by the drive of the hand-use motor 20 through the pair of worm gears 19A, 19B and the shafts thereof. In other words, the hand suspending part 7 (hand 9) is turned with the turning angle of 90 degrees in the rotation direction opposite to the rotation direction of the turning table 12 by the hand-use motor 20.

Figure 3:
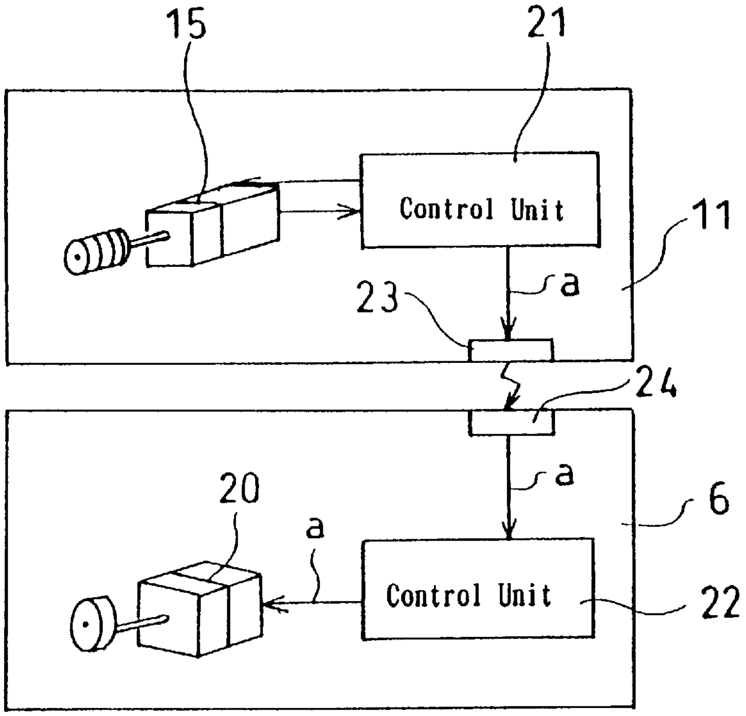
FIG. 3 is a diagram showing a control unit for controlling turning angle of the hand suspending part with respect to the carriage part.
Figure 4:
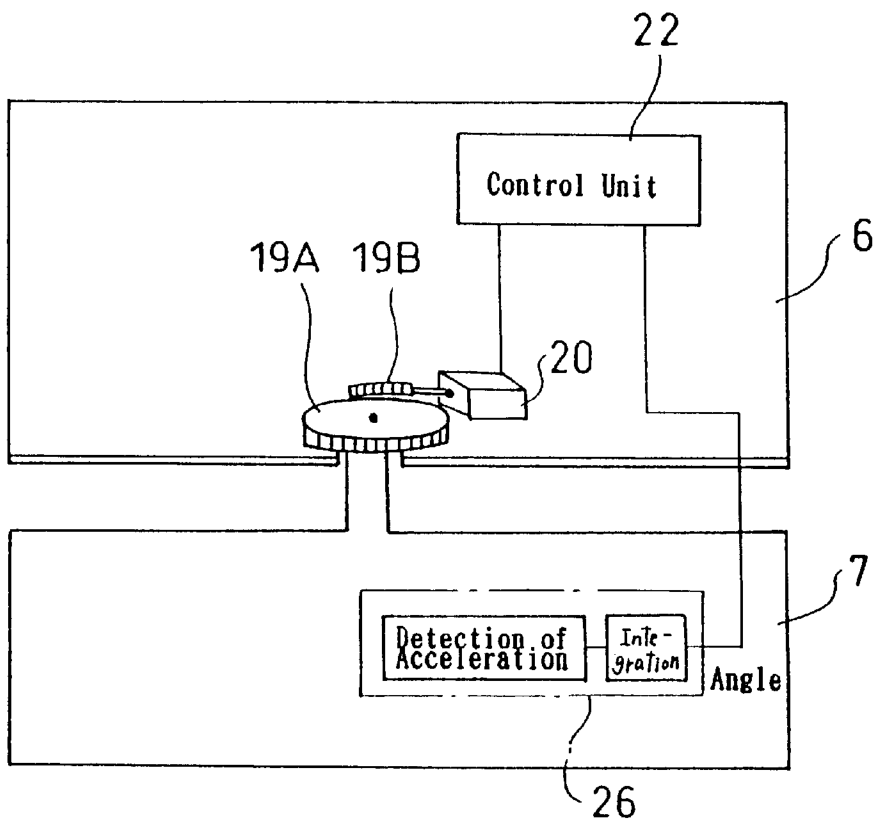
FIG. 4 is a diagram showing another control unit for controlling the turning angle of the hand suspending part with respect to the carriage part.

The motors 15 and 20 are connected to a table control unit 21 and a hand control unit 22, respectively, as shown in FIG. 3.

The table control unit 21 drives the table-use motor 15 under the command from an operating system of the building (on the grounded side, not shown) to turn the turning table 12 by only a predetermined angle (90 degrees) under control. Also, the table control unit 21 clocks the pulse number from a pulse encoder (not shown) of the table-use motor 15. The clocked pulse number is output to for example a transmitting part 23 of the support 11 in the form of rotation signals $\alpha$ showing the turning state of the turning table 12.

The hand control unit 22 is built in the carriage part 6. The hand control unit 22 has a receiving part 24 for receiving electric waves (rotation signals a) transmitted from the transmitting part 23 and drives the hand-use motor 20 under the signals $\alpha$ received by the receiving part 24 to regulate the turning of the hand suspending part 7. In other words, the hand control unit 22 controllably turns the hand suspending part 7 and the hand 9 in the opposite directions by only 90 degrees under the rotation signals α, while bringing their rotations into synchronization with the rotation of the turning table 12.

Thus, when the turning table 12 is turned by only 90 degrees to connect the table track 13 to the by-pass track 4, the hand suspending part 7 and the hand 9 are turned in the directions opposite to each other by only 90 degrees, while being synchronized with the rotation of the turning table 12. Therefore, the conveying object 25 grasped by the hand 9 is kept in its initial state of initially conveyed to the turning table 12, without being changed in direction by the turning table 12 and the hand suspending part 7 rotating in the directions opposite to each other. The driving means 18 (the pair of worm gears 19A, 19B and the hand-use motor 20) and the control units 21, 22 form rotation control means of the overhead conveyance vehicle 5 for controlling the turning of the hand suspending part 7 relative to the carriage part 6.

While one embodied form is shown in FIG. 3 of controlling the rotation of the hand suspending part 7 by detecting the turning state of the turning table 12, the invention is not limited to this embodied form. Shown in FIG. 4 for example is a variant wherein the hand suspending part 7 is provided with an angle detecting equipment 26 using a gyro and the like, whereby when the turning table 12 is turned, the drive of the hand-use motor 20 is controlled to keep the angle before rotation of the hand suspending part 7 unchanged. Thus, the conveying object 25 grasped by the hand 9 is kept in its initial state of initially conveyed to the turning table 12.

Next, conveyance of the conveying object 25 attained by the overhead conveyance device 1 is described.

In FIGS. 1–3, the overhead conveyance vehicle 5 lowers the hand 9 from the hand suspending part 7 to grasp the conveying object 25 with the pawls 10 of the hand 9. Subsequently, the overhead conveyance vehicle 5 raises the hand 9 with the use of t he hand suspending part 7 and keeps the conveying object 25 in its suspended state. The overhead conveyance vehicle 5 drives the carriage part 6 to the branching part 3 to convey the conveying object 25 and brings it to a stop within the table track 13.

In this state, the operating system (on the grounded side) outputs a command to the table control unit 21, and the table-use motor 15 is driven by the table control unit 21 to which the command was input. The turning table 12 is rotated only a 90 degrees turn by the drive of the table-use motor 15. Simultaneously, the table control unit 21 clocks the pulse number fed back from the table-use motor 15 (pulse encoder) and outputs the rotation signals α to the hand control unit 22 through the transmitting part 23 and the receiving part 24. When receiving the rotation signals α, the hand control unit 22 controls the drive of the hand-use motor 20. The hand-use motor 20 rotates the hand suspending part 7 (hand 9) only a 90 degrees turn in the direction opposite to the rotation direction of the turning table 12, while bringing the turning of the hand suspending part 7 into synchronization with the turning of the turning table 12. Thus, the conveying object 25 grasped by the hand 9 is kept in its initial state of initially conveyed to the turning table 12, without being changed in direction, due to the turnings of the turning table 12 and the hand suspending part 7 in the directions opposite to each other. The turning table 12 changes the traveling direction of the overhead conveyance vehicle 5 by the 90 degrees turn permits the connection of the table track 13 to the by-pass track 4. The overhead conveyance vehicle 5 which was changed in the traveling direction drives the carriage part 6 from the table track 13 to the by-pass track 4 to convey the conveying object 25 to a predetermined place.

Thus, in the overhead conveyance device 1, since the hand suspending part 7 is reversed in synchronization with the turning of the turning table 12 when the track is switched from the track 2 to the by-pass track 4 by rotating the turning table 12, the conveying object 25 won't change in direction. Then, the turning table 12 connects the table track 13 to the by-pass track 4, while keeping the conveying object 25 in its initial state of initially conveyed to the turning table 12. Thus, since the conveying object 25 is kept from turning around, various devices can be arranged in neighborhood of the branching part 3. Also, since the various devices can be arranged with little concern for their heights, and as such can avoid the productivity reduction resulting from the reduction in the number of various devices as is involved in the prior art. As a result of this, the overhead conveyance device 1 can provide an increased conveyance rate of the conveying object 25 per unit of time and shortened conveyance time. Also, since various devices are arranged in the neighborhood of the branching part 3, an area of a land on which the building was erected can effectively be used, and as such need not enlarge the building for increase of productivity.

Next, description on the overhead conveyance device of the second embodiment will be given with reference to FIGS. 5–7. The same reference characters in FIGS. 5–7 as those in FIG. 1 refer to corresponding parts in construction, so description thereon will be omitted.

In the overhead conveyance device 1 shown in FIG. 5, the hand suspending part 7 (hand 9) is fixed and the turning table 12 is turned relative to the hand 9, whereby the conveying object 25 is kept in its initial state of initially conveyed to the turning table 12.

In FIG. 5, a first fixing means 30 for regulating the turning of the hand suspending part 7 from outside is provided on the support 11. The first fixing means 30 is composed of a linear actuator having a stopper 31 movable back and forth with respect to the hand suspending part 7. A second fixing means 32 for regulating the turning of the hand suspending part 7 from inside is provided in the interior of carriage part 6, as shown in FIG. 6. The second fixing means 32 is composed of a disk 33 fixed to an end of a shaft projecting from the hand suspending part 7 into the carriage part 6; and a brake 34 capable of selectively pressing against the disk 33. The second fixing means 32 is not limited to the one of FIG. 6, but may have another construction shown in FIG. 7. The second fixing means 32 of FIG. 7 is composed of an electromagnet 35 fixed in the carriage part 6; and a clutch disk 37 fixed to an end of a shaft onto which the electromagnet 35 is loosely fitted. The electromagnet 35 is magnetized to absorb the clutch disk 36, so as to regulate rotation of the hand suspending part 7 or is demagnetized to detach the clutch disk 36 from it, so as to permit the rotation of the hand suspending part 7. The first fixing means 30 forms a rotation regulating means of the overhead conveyance vehicle 5 for controlling the turning of the hand suspending part 7 relative to the carriage part 6.

In the overhead conveyance device 1 of FIG. 5, after the hand 9 grasps the conveying object 25, the brake 34 of the second fixing means 32 is pressed against the disk 33 to regulate the turning of the hand suspending part 7, whereby the conveying object 25 is regulated in rotation during conveyance. The overhead conveyance vehicle 5 conveying the conveying object 25 drives the carriage part 6 to the rotary branching part 3 and brings it to a stop within the table track 13.

In this state, the first fixing means 30 drives the stopper 31 forth up to the hand suspending part 7 and brings it into engagement with a corner (projection) of the hand suspending part 7 to regulate the turning of the hand suspending part 7.

The second fixing means 32 permits the brake 34 to move away from the disk 33. Thus, the turning of the hand suspending part 7 is regulated by the first fixing means 30, and the carriage part 6 is permitted to turn relative to the hand suspending part 7. When the table-use motor 15 is driven to turn the turning table 12, only the carriage part 6 is rotated only a 90 degrees turn, together with the turning table 12. As a result of this, the turning table 12 (carriage part 6) is turned relative to the hand suspending part 7, so that the conveying object 25 is kept in its initial state of initially conveyed to the turning table 12. The 90 degrees turn of the turning table 12 permits the table track 13 to be connected to the by-pass track 4, so as to change the traveling direction of the overhead conveyance vehicle 5. The first fixing means 30 drives the stopper 31 to move away from the hand suspending part 7. The overhead conveyance vehicle 5 which was changed in the traveling direction conveys the conveying object 25 to a predetermined place by the carriage part 6 being made to run from the table track 13 into the by-pass track 4.

Next, description on the overhead conveyance device 1 of FIGS. 1–4 applied to a conveyance system for wafers used for manufacturing semiconductor devices will be given with reference to FIGS. 8–10.

Figure 8:
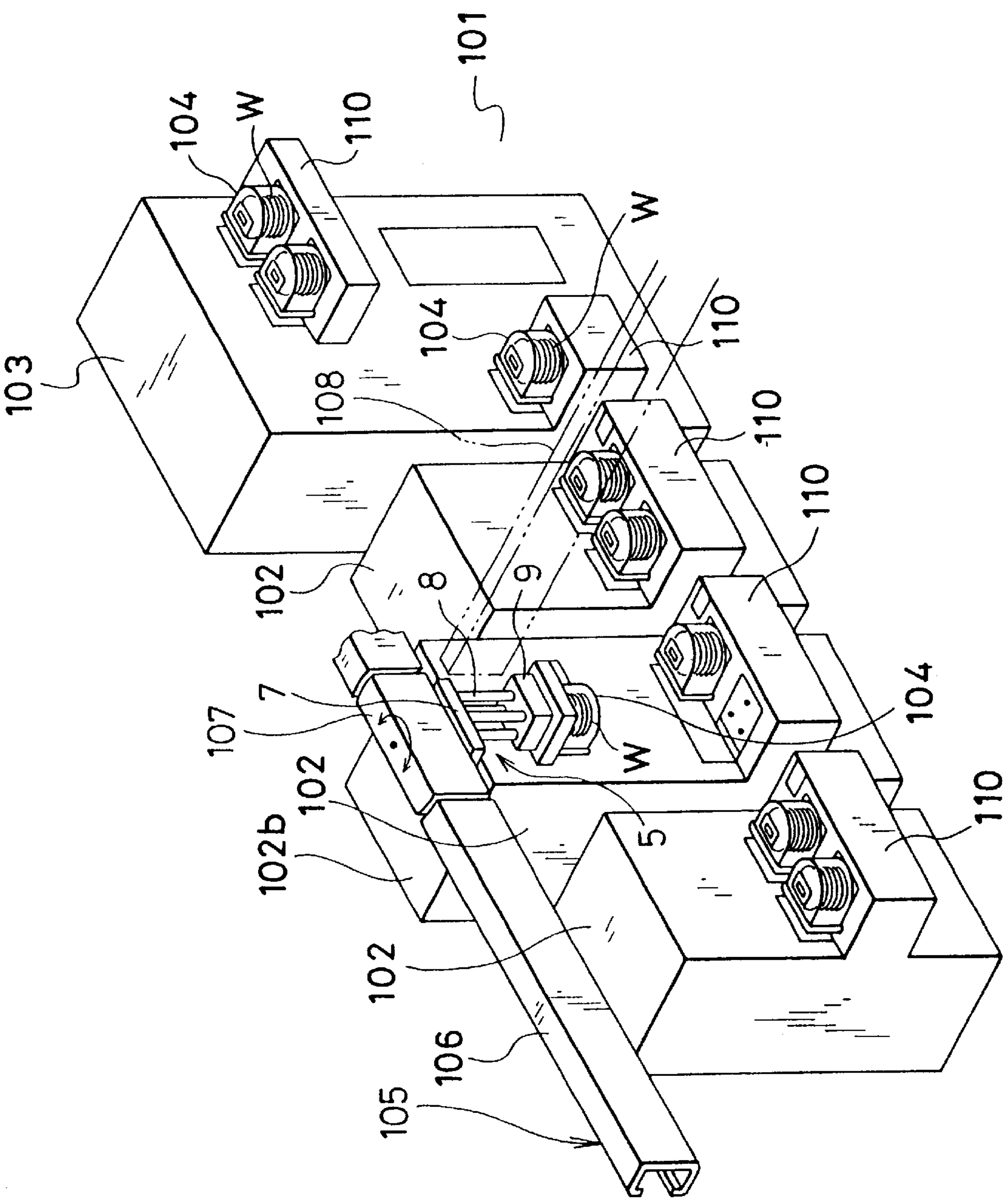
FIG. 8 is a perspective view showing the overhead conveyance device in a conveyance system for wafers used for manufacturing semiconductor devices.
Figure 9:
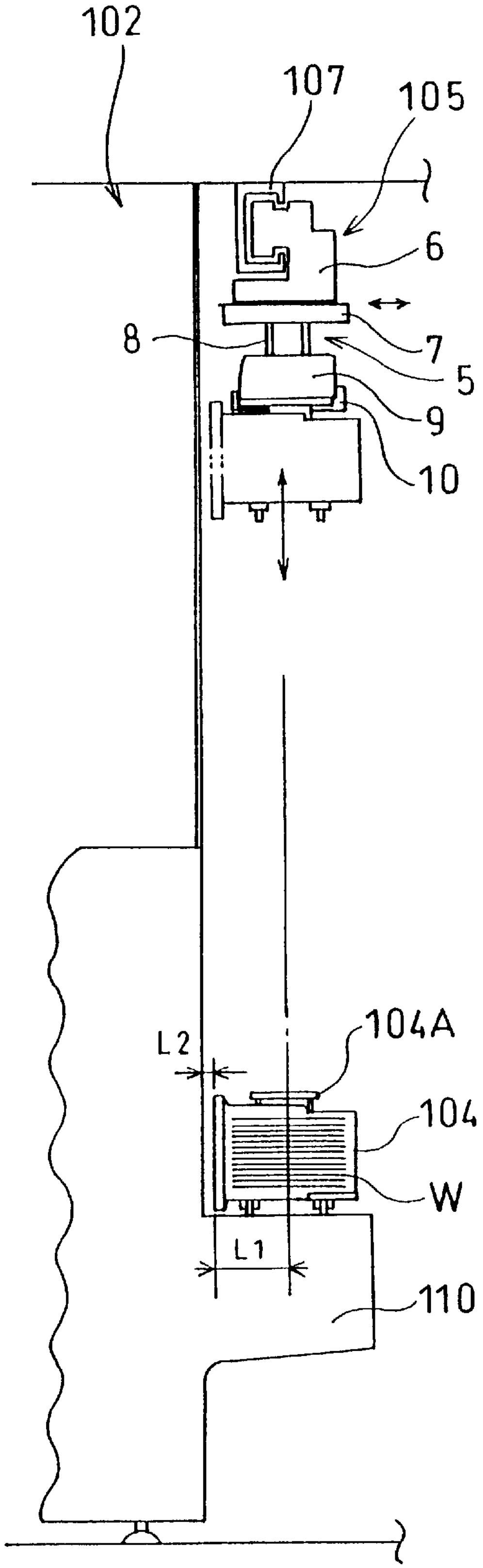
FIG. 9 is a side view showing conveyance of the overhead conveyance device in the conveyance system for wafers used for manufacturing semiconductor devices.

Shown in FIG. 8 is a conveyance system for conveying wafers W used for manufacturing semiconductor devices (hereinafter it is simply called "semiconductor wafer W") between semiconductor processing units 102 and between a semiconductor processing unit and a stocker 103 which are placed in a cleanroom 101. In the conveyance system, an overhead conveyance system 105 is used for conveying the carrier 104 (the conveying object) containing therein the semiconductor wafers W by the plural number, keeping the conveying object in its suspended state.

The overhead conveyance system 105 is composed of: a loop-like track 106 located over load ports 110 of the semiconductor processing units 102 and the stocker 103 which are arranged in parallel in the cleanroom 101; and the overhead conveyance vehicle 5 that travels along the track 106. A rotary branching part 107 is located in the track 106 at a place thereof over a semiconductor processing unit 102.

The overhead conveyance vehicle 5 is composed of: the carriage part 6; the hand 9 capable to grasp the carrier 104, keeping it in the suspended state; and the hand suspending part 7 for suspending the hand 9 in such a manner as to up and down the hand 9. The driving means illustrated in FIGS. 1–4 is provided between the carriage part 6 and the hand suspending part 7. When the carriage part 6 enters the branching part 107 and turns, the driving means allows the hand suspending part 7 to turn in the opposite direction relative to the carriage part 6.

The overhead conveyance system 105 conveys the carrier 104 grasped by the hand 9 to a place over the load port 110 of each of the semiconductor processing units 102 (the stocker 103) by the traveling of the carriage part 6 along the track 106. In this state, the hand suspending part 7 is shifted with respect to the carriage part 6 on the basis of values previously given to the conveyance system 105, to align the hand 9 with the load port 110, as shown in FIG. 9. Then, the hand 9 is lowered down to a position at which the carrier 104 on the load port 110 can be grasped by the hand by extending the sling member 8. Subsequently, the hand 9 is operated to open and close the pawls 10 to grasp a handle 104A of the carrier 104 provided at the top thereof and then the hand suspending part 7 takes up the sling member 8, whereby the carrier 104 containing therein the semiconductor wafers W is grasped in its suspended state.

After the carrier 104 is grasped by the hand 9 in its suspended state, the overhead conveyance vehicle 5 conveys the carrier 104 to a place over the load port 110 of another processing unit 102 or the stocker 103 by the traveling of the carriage part 6. Then, after the hand 9 is aligned with the load port 110 by the shifting of the hand suspending part 7, the carrier 104 is lowered down to a place over the load port 110 of another processing unit 102 or the stocker 103 by extending the suspender 8. In this state, the hand 9 is operated to open the pawls 10 to put the carrier 104 on the load port 110 and then the sling member 8 is taken up again, thereby moving on conveyance.

Incidentally, in order to increase a conveyance rate per unit of time or shorten the conveyance time, a plurality of by-pass tracks 108 extending across the loop-like track 106 are placed in the overhead conveyance system 105. The by-pass tracks 108 and the track 106 are connected to and disconnected from each other by the turning-table-type branching part or rotary branching part 107. In FIG. 8, the branching part 107 is placed over the central semiconductor processing unit 102. The branching part 107 is disposed in place so that it can turn in close proximity of the roof 102*b* of each of the processing units 102. In other words, in the state in which the carrier 104 is grasped by the hand 9 and taken up from the load port 110 (shown in FIG. 8), adequate room required for the carrier 104 confronting the processing unit 102 to turn can be found.

The branching part 107 is provided with the turning table 12 which is allowed to turn to connect the by-pass track 108 to the track 106. In order to shorten the conveyance time, after the carrier 104 is grasped by the hand 9, the overhead conveyance vehicle 5 drives the carriage part 6 to the turning table and brings it to a stop thereat. Subsequently, the branching part 107 rotates the turning table 12 the 90 degrees turn to connect the table track of the turning table 12 to the by-pass track 108. Thus, the carrier 104 grasped by the hand 9 need not be made to make the circuit of the loop-like track 106, and as such can increase a conveyance rate of the carrier 104 and shorten the conveyance time with the aid of the by-pass track 108.

Figure 10:
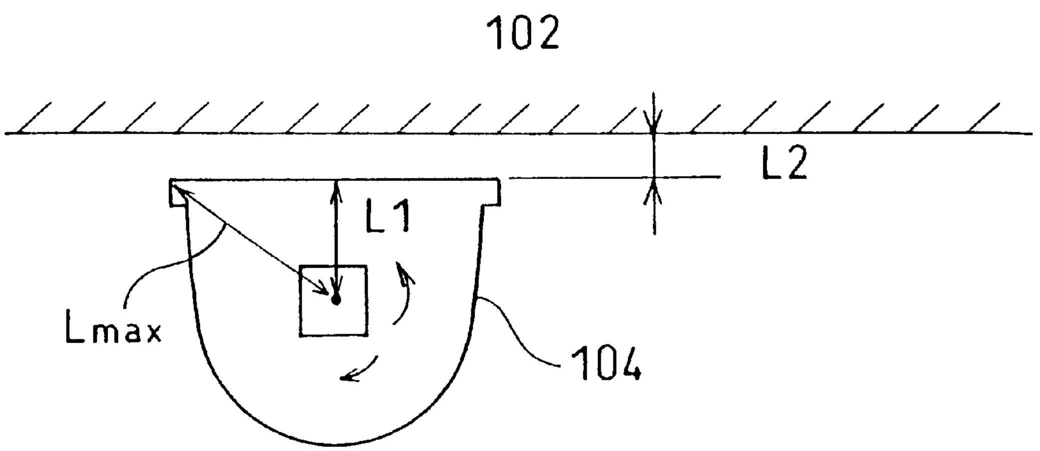
FIG. 10 is a plan view of the wafers containing conveying object used as a conveying object.

Incidentally, the carrier 104 of FIG. 10 is of semiovel and its surface formed at a distance L1 from the center confronts the processing unit 102. The carrier 104 is conveyed, while being kept at a distance L2 from the processing unit 102. The distance L2 have to be set at such a distance that the maximum size Lmax does not substantially cause interference with the processing unit 102 when the carrier 104 is turned. However, if the carrier 104 is not turned, the distance L2 from the processing unit 102 can be kept to a minimum.

Thus, it is of important that when the carriage part 6 is turned by the branching part 107, the hand suspending part 7 is turned in the opposite direction relative to the carriage part 6, so that even when the carriage part 6 is driven into the branching part 107 and turned by it, the carrier 104 grasped by the hand 9 is prevented from changing in direction. For achieving such a function, the overhead conveyance devices of the first embodiment of FIGS. 1–4 and of the second embodiment of FIGS. 5–7 are used. In FIG. 9, even when the carriage part 6 is turned, the hand suspending part 7 is kept in its state presented in the illustration.

As a result of this, the processing units 102 and the stocker 103 can be placed in proximity of the branching part 107 without being subject to constrains to avoid the contact with the carrier 104 that is turned by the branching part 107. Also, the processing units 102 and the stocker 103 are not subjected to constrains of size reduction in height, when placed in proximity of the branching part 107.

This can avoid the drawback that the number of processing units 102 to be placed in the cleanroom 101 is required to be limited, so that the production is reduced or the drawback that the interior of the cleanroom 101 is required to be enlarged to increase the number of processing units 102 to be placed therein. This can also avoid the drawback that the limited number of processing units 102 and the stocker 103 to be placed in the clean room 101 requires complicated conveyance, reduced conveyance rate and extended conveyance time.

While description was given on the embodiments in which the conveying object 25 (the carrier 104) grasped by the hand 9 is kept unchanged in direction even when the carriage part 6 is turned within the branching part 3, 107, the invention is not limited to the illustrated embodiments. For example the invention is also applicable to the case when there is some hindrance on the conveyance way, the hand suspending part 7 is turned relative to the carriage part 6 by only a predetermined angle on the conveyance way, in order to avoid the hindrance in the conveyance track.

Industrial Applicability

As mentioned above, the overhead conveyance device and the overhead conveyance vehicle are of suitable for the use with the turning table type or rotary type branching part, located in the track, for changing the traveling direction of the overhead conveyance vehicle.

What is claimed is:

1. An overhead conveyance device comprising a carriage part that travels along an overhead track, a hand suspending part mounted on said carriage part in rotatable relation relative thereto, a hand part suspended from said hand suspending part in such a manner as to be movable up and down, and rotation control means for controlling turning said hand suspending part relative to said carriage part.

* * * * *